March 26, 1929.  E. A. LARSSON  1,706,618

CURRENT COLLECTOR

Filed Oct. 9, 1926

Inventor

Ernst A. Larsson

By

Attorney

Patented Mar. 26, 1929.

1,706,618

UNITED STATES PATENT OFFICE.

ERNST A. LARSSON, OF MANSFIELD, OHIO, ASSIGNOR TO THE OHIO BRASS COMPANY, OF MANSFIELD, OHIO, A CORPORATION OF NEW JERSEY.

CURRENT COLLECTOR.

Application filed October 9, 1926. Serial No. 140,633.

My invention relates to current collectors and particularly that class known as the wheel type.

The object of my invention is to provide a device which is self-lubricating with large bearing surfaces, which are constant, between the support and the wheel and means for adjusting the contact and maintaining it constant.

With the ordinary straight axle which is generally used the wear between the axle and the wheel cannot be taken up and this permits a reduction in current carrying capacity from the wheel to the harp unless auxiliary means is employed which is independent of the bearing, but in my device the carrying capacity, which is effected by the contact between the wheel and its support, is constant.

My invention resides in the new and novel construction, combination and relation of the parts herein described and shown in the accompanying drawing.

Figure 2:
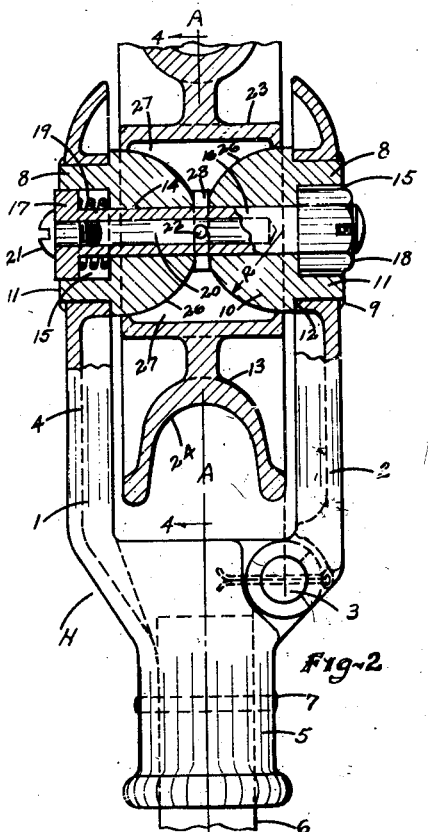
Fig. 2 is a view in partial section of Fig. 1 taken on the line 2—2.
Figure 1:
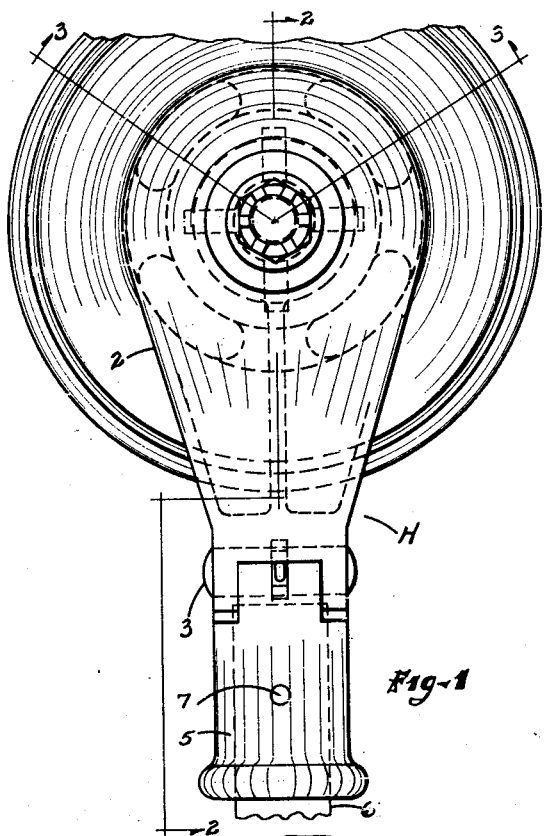
Fig. 1 is a side view of my invention with a portion of the wheel flange broken.
Figure 3:
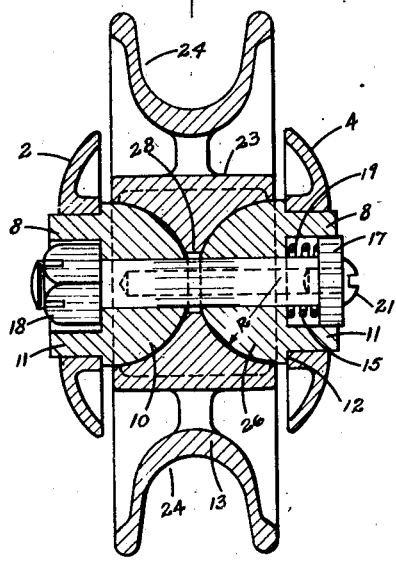
Fig. 3 is a view in partial section of Fig. 1 taken on the line 3—3.
Figure 4:
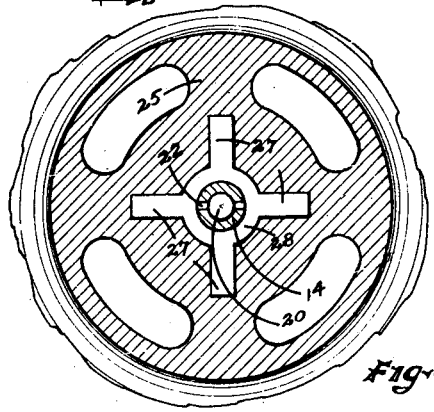
Fig. 4 is a sectional view of the center portion of the contact wheel taken on the line 4—4 of Fig. 2.

In the preferred embodiment of my invention I employ a trolley harp or support H which comprises a main member 1 and an auxiliary member 2 pivotally secured to the main member 1 by means of the pin 3.

The member 1 is provided with an upright arm 4, corresponding to the arm 2, and is also provided with a tubular member 5 arranged to receive the end of a trolley pole 6 and secured thereto by means of the pin 7. The arms 2 and 4 are provided with oppositely disposed and registering orifices adjacent their outer ends to receive the bearing members 8.

The bearing members I prefer to make detachable from the arms 2 and 4, although they may be formed integrally if desired. When formed separately they may be made of copper or copper base material, or of iron, and secured to the arms 2 and 4 by threading or by peening over the projecting edge 9 as shown. I have shown the bearing member 8 provided with the head 10 and the projecting sleeve 11 and the shoulder 12. The head 10 is provided with a spherical surface having the center of the radius R on a vertical line with the center of the pin 3 and parallel to the longitudinal axis A—A. I prefer to have these centers aline as stated for the reason that as the arm 2 moves inward, due to possible wear of the parts, then the contact between the head 10 and the wheel 13 will remain constant. Of course, the wear is not great, but it is my aim to maintain the device as efficient as possible. If the center of the pin 3 and the center of the radius R are not on a line the device is still operative, but there may be a slight variation in the contact of the parts. The relation between the parts 10 and the wheel is that of the well known ball and socket type of joint.

The members 8 are pierced with a passage 14 extending therethrough and having enlarged portions 15. The passages 14 register and are alined with each other, and there is positioned within the passage a bolt member 16 having a collar 17 at one end and a threaded nut 18 at the other end. The members 17 and 18 are mounted in the enlarged pockets 15 as shown and interposed between the collar 17 and the head 10 is a spring 19 which tends to bring an inward pressure upon the members 8 to move them toward the center. The amount of tension on the spring 19 can be adjusted by means of the nut 18. Within the bolt member 16 there is a passage 20 which is closed at the outer end by means of a screw 21 and which has a side opening 22. The passage 20 may be filled with grease if desired and this will tend to work out of the passage through the opening 22 and from there into the hollows of the wheel 13, as later explained.

The wheel 13 comprises the usual hub 23, the flange groove 24 and connecting spokes 25. The hub 23, however, is constructed on a different principle than like devices in the past, in that, it is provided with oppositely disposed side bearing surfaces 26 which are spherical and of the same radius as that of the surfaces on the members 8.

The interior of the hub I have shown with four cavities 27 which radiate from a center cavity 28, and these cavities may be filled with graphite or grease to act as a lubricant.

The construction of a current collector as just described will permit of a large and constant current collecting bearing surface between the wheel and the harp and will possess high lubricating properties and avoid the necessity of auxiliary current conducting means between the wheel and the harp.

The bearing surfaces instead of being made spherical could be made conical or even flat, the face of which would be parallel to the vertical axis of the wheel, but neither of these arrangements would have the efficiency of the spherical surface, neither would the conical surface permit of a universal movement between the parts without changing the efficiency of the contact.

I claim:

1. A current collector comprising a support member having spaced and movable arms, a current collector, means projecting from the arms to engage with oppositely disposed sockets in the collector to support the collector and a single resilient and adjustable means acting upon the two projecting means to move the projecting means toward each other to engage the sockets.

2. A trolley harp comprising a pair of arms pivoted relative to each other at one end and one arm having means to attach the harp to a support, each arm provided with an inwardly projecting member and having a spherical bearing surface to engage and support a current collector and means passing axially through the projecting members to move the projecting members toward each other.

3. A trolley harp comprising a pair of arms pivoted relative to each other at one end and one arm having means to attach the harp to a support, each arm provided with an inwardly projecting member and having a spherical bearing surface to engage and support a current collector and yielding means passing axially through the projecting members to move the projecting members toward each other and yieldingly maintain the arms in a predetermined position.

4. An article of manufacture used to collect current for a moving vehicle comprising a device having a flanged groove, to engage a conductor, a hub and oppositely disposed sockets positioned in the faces of the hub to receive a member to support the device, the walls of the socket constituting bearing surfaces of a spherical shape, the center of radius of the spherical surfaces being on a line with the outer edge of the hub.

5. A current collector comprising a harp having two spaced arms, one arm being hinged and the center of hinge being a predetermined distance from the longitudinal axis of the harp, a projecting support from each arm and oppositely disposed, the bearing surface of each support being spherical with the center of radius of the surface the same distance from the longitudinal axis as that of the axis of the hinge.

6. A trolley harp comprising a pair of hinged arms provided at one end with means to secure the arms to a support, means at the other end of each arm to engage a current collecting member and means passing through the arms co-axial with the collector to yieldably move them toward each other.

7. A trolley harp comprising a pair of hinged arms provided at one end with means to secure the arms to a support, means at the other end of each arm to engage a current collecting member, means passing through the arms to yieldingly move them toward each other and means to adjust the said yielding means to vary its tension.

8. A trolley harp comprising a pair of hinged arms provided at one end with means to secure the arms to a support, means at the other end of each arm to engage a current collecting member and means passing through the arms to yieldingly move them toward each other, the said means comprising a bolt having a head at one end and a nut at the other end and a spring between one arm and the head, the tension of which is varied by adjusting the nut.

In testimony whereof I affix my signature.

ERNST A. LARSSON.